United States Patent [19]
Rifqi

[11] Patent Number: 6,114,039
[45] Date of Patent: Sep. 5, 2000

[54] PROCESS FOR TREATING GLASS SUBSTRATES

[75] Inventor: Françoise Rifqi, Paris, France

[73] Assignee: Saint Gobain Vitrage, Courbevoie, France

[21] Appl. No.: 08/930,278

[22] PCT Filed: Feb. 6, 1997

[86] PCT No.: PCT/FR97/00233

§ 371 Date: Dec. 19, 1997

§ 102(e) Date: Dec. 19, 1997

[87] PCT Pub. No.: WO97/29058

PCT Pub. Date: Aug. 14, 1997

[30] Foreign Application Priority Data

Feb. 7, 1996 [FR] France .................................. 96 01484

[51] Int. Cl.⁷ .............................. B32B 17/00; C03C 15/00
[52] U.S. Cl. ............................ 428/410; 65/61; 65/30.13; 65/30.14; 501/70; 428/428; 428/336; 428/212; 428/141
[58] Field of Search ................ 65/61, 30.13, 30.14; 501/70; 428/410, 428, 334, 212, 111

[56] References Cited

U.S. PATENT DOCUMENTS

| | | | |
|---|---|---|---|
| 3,653,864 | 4/1972 | Rothermel et al. | 65/30.12 |
| 4,803,106 | 2/1989 | Lenhart et al. | |
| 5,316,844 | 5/1994 | Suzuki et al. | |
| 5,900,296 | 5/1999 | Hayashi et al. | 428/64.1 |

FOREIGN PATENT DOCUMENTS

| | | |
|---|---|---|
| 0 579 399 | 1/1994 | European Pat. Off. . |
| 0 592 237 | 4/1994 | European Pat. Off. . |
| 96 11888 | 4/1996 | WIPO . |

OTHER PUBLICATIONS

Database WPI, Week 30, Derwent Publications Ltd., London, GB; AN 96–292416, XP002017839 & JP 08 124 153 A (Nippon Sheet Glass Ltd) May 17, 1996, see abstract.

Chemical abstracts, vol. 114, No. 4, Jan. 28, 1991, Columbus, Ohio, US; abstract No. 28896t, p. 299; P002017838, see abstract & JP 02 153 847 A (Murase Glass Co Ltd) Jun. 13, 1990.

Data Base WPI, Week 47, Derwent Publications Ltd., London GB; AN 88–336490, XP002017840 & SU 1 395 597 A (Buraev A MI), May 15, 1998, see abstract.

Database WPI, Week 43, Derwent Publications Ltd., London GB; AN 82–91185e; XP002017841 & JP 57 149 850 A (Tokyo Shibaura Elec Ltd), Jun. 29, 1989, see abstract.

Database WPI, Week 14, Derwent Publications, Ltd., London GB; AN 95–102849, XP002017842, & JP 07 129 169 A (Technology AG KK ), Jan. 31, 1995, see abstract.

*Primary Examiner*—Deborah Jones
*Assistant Examiner*—Jason Resnick
*Attorney, Agent, or Firm*—Pennie & Edmonds LLP

[57] ABSTRACT

The invention relates to a process for treating glass substrates, in particular those used as memories for "peripherals" in the field of data processing.

According to the invention, the process includes a surface ion-exchange strengthening step and a subsequent substrate surface dealkalization step.

25 Claims, No Drawings

PROCESS FOR TREATING GLASS SUBSTRATES

BACKGROUND OF THE INVENTION

The invention relates to a process for treating glass substrates, in particular those used as memories for "peripherals" in the field of data processing.

Although the invention is not limited to this application, it will be described with reference to the production of magnetic hard disks.

A magnetic hard disk is generally composed of a support element formed so that it has the shape of a disk pierced at its centre. A series of thin magnetic films, serving for data storage, may in particular be deposited on this disk.

The data is recorded and read using one or more read heads, which are placed above the disk, while the latter is undergoing a rotational movement. In order to achieve high performance in reading the data, the read head must approach the disk as close as possible; one speaks in this case of "contact recording". This is because the signal detected by the head decreases exponentially as its height increases. Moreover, current demands are requiring an ever increasing storage density. This means that the area for storing a given item of information continues to decrease. In order for the recorded data to be read in this way, the distance separating the disk from the read head must continue to decrease; this distance must be less than 300 ångströms.

Substrates for producing magnetic hard disks are in particular described in U.S. Pat. No. 5,316,844; these are aluminium substrates. This document also describes an important aspect of these substrates; they must exhibit only very low roughness. This document indicates roughness values, the Rq, or averaged roughness, of which is between 100 and 300 ångströms. Current requirements, associated with the growing demand for storage and therefore with an ever decreasing disk/read head distance, correspond to an Rq of less than 20 ångströms. The Rq is the averaged roughness measured, in the present case, using an atomic force microscope (AFM) on a 5×5 micron square.

Moreover, although the requirements regarding the storage capacity of magnetic hard disks continue to increase, another requirement, which may seem paradoxical, relates to the dimensions of these hard disks.

This is because these data-storage units must take up as little room as possible and also have a low mass. These requirements are associated, on the one hand, with the growing demand for portable, and therefore compact and lightweight, storage units; the development of portable data-processing tools and of software requiring large storage capacities is the basis of this requirement. On the other hand, still for the purpose of increasing data storage capacities, it is advantageous to be able to combine several magnetic hard disks in a given space and therefore to have thinner substrates.

A substrate made of aluminium can have a thickness of less than 0.6 millimeters and at the same time have the required properties for constituting a hard disk, in particular in terms of rigidity and resistance to damage under the impact of the read head against the disk.

In order to remedy these drawbacks and to be able to lighten, and possibly reduce the thickness, of such a substrate, it has been proposed, in particular in Patent Application EP-579,399, to make it from glass. Such a substrate has in particular been produced from a ribbon of glass obtained using the "float" technique, the said ribbon being converted into sheet and finally cut up and shaped into disks to the required dimensions. These are then polished in order to obtain the desired thickness and the desired roughness.

During tests, it has become apparent that these lass substrates are subject to various drawbacks and cannot therefore be used satisfactorily for the production of magnetic hard disks.

In particular, the surface of these glass substrates undergoes a major loss of alkali metals, especially potassium or sodium and essentially the ion provided by chemical toughening. Now, these alkali metals have deleterious effects, especially in the presence of moisture, on the magnetic films deposited on the substrates. This is because it appears that the release of alkali metals into these layers results, in the relatively short term, in the destruction of the data recorded.

SUMMARY OF THE INVENTION

The object of the invention is to provide a process for treating glass substrates enabling the above drawbacks to be alleviated and resulting in glass substrates which exhibit good chemical resistance and in particular which release alkali metals only in a quantity harmless to the magnetic films.

The object of the invention is also to provide a process resulting in substrates of which the mechanical strength, planarity and roughness are satisfactory for the construction of support elements for producing data-storage units.

These objects are achieved according to the invention by a process for treating glass substrates which includes a surface ion-exchange strengthening step and a substrate surface dealkalization step subsequent to the said ion-exchange step.

DETAILED DESCRIPTION OF THE INVENTION

The ion-exchange strengthening step is advantageously carried out by chemical toughening. This step in particular enables the surface to be mechanically strengthened; it thus allows a satisfactory mechanical strength, in particular the flexural strength and the resistance to impacts with and crushing by, for example, the read head, to be obtained. Such a step consists in substituting ions in the surface of the glass with other ions having a different volume in order to modify the stresses in the surface of the substrate and thus its mechanical properties. However, the process according to the invention leads in its second step to the removal of surface ions from the said substrate. It is thus surprising for those skilled in the art that dealkalization of the glass substrate, for the purpose of reducing or even eliminating the subsequent release of ions, enables the mechanical properties obtained, for example by chemical toughening, to be preserved.

Preferably, the dealkalization is carried out to a substrate depth of less than 1 micron. According to this preferred method of implementation, the dealkalization is carried out to a depth of less than that to which the chemical toughening was previously carried out. The substrate treated according to the invention can thus be used as a support for magnetic films for the purpose of data storage without the risk of the said films being damaged because of the release of alkali metals on the surface of the substrate.

According to a variant of the invention, the dealkalization is carried out by wet route. This may in particular be carried out by contact with aluminium chloride $AlCl_3$ which results in leaching of the surface of the glass substrate. Such a dealkalization treatment can be carried out at a temperature close to 100° C.; such operating conditions prevent any risk of the surface stresses in the substrate relaxing.

According to another variant of the invention, the dealkalization is carried out by sublimation of a sulphate at the surface of the substrate. Preferably, the treatment is carried out using ammonium sulphate $(NH_4)_2SO_4$.

According to this variant, a surface layer of dense silica is created which acts as a barrier to the diffusion of alkali metals. In this variant, the temperature is advantageously between 450 and 580° C. during the dealkalization; the treatment time during dealkalization is advantageously less than 5 hours and is preferably between 10 minutes and 3 hours.

According to one method of implementation of the invention, the ion-exchange strengthening is achieved by chemical toughening in a bath of potassium nitrate $KNO_3$ or of potassium dichromate $K_2Cr_2O_7$.

According to another method of implementation of the invention, the ion-exchange strengthening is achieved by chemical toughening in a mixed bath, such as $KNO_3/AgNO_3$. A mixed bath allows, in particular, a double ion exchange which may lead to a mixed-alkali effect after exchange and therefore to an improvement in the resistance to alkaline attack.

The toughening temperature is advantageously between 400 and 520° C. As regards the duration, this is advantageously less than 25 hours and preferably less than 20 hours.

Advantageously, the invention provides, initially, i.e. before the ion-exchange strengthening step, a step of polishing the glass substrate. This step may be carried out by mechanical means so as to result in particular in the desired thickness of the substrate and in a roughness of the substrate for which Rq is less than 20 ångströms and preferably less than 15 ångströms.

In an advantageous variant of the invention, a second polishing step, called "finish polishing", is also provided. The purpose of this step is to bring the Rq, or averaged roughness, to a value close to 6 ångströms and preferably less than 5 ångströms. Such roughness values may contribute in particular to further improvement in the data-storage capacities. This step may in particular be carried out by chemical treatments, for example by the action of colloidal silica, of a magnetic fluid or of cerium oxide.

This "finish polishing" step may be carried out at various stages in the treatment. A first implementation of the invention consists in carrying out this step immediately after the first polishing step. From the roughness standpoint, such an implementation leads to good results. However, the ion-exchange strengthening step may slightly modify the surface finish of the substrate and therefore adversely affect the results regarding roughness. However, the inventors were able to show that the dealkalization contributed to improving the roughness, in particular in the case of treatment with ammonium sulphate.

Another implementation consists in carrying out this "finish polishing" step at the end of the treatment according to the invention. Since this is the last step, the roughness resulting from the treatment will then be preserved. However, it seems that, according to this implementation variant, the "finish polishing" step must, for example in the case of a treatment with aluminium chloride, be carried out to a substrate depth of at most 0.2 microns so as in particular not to degrade the hydrolytic resistance obtained as a result of a dealkalization treatment carried out beforehand.

A preferred implementation of the invention consists in carrying out the "finish polishing" step immediately after the ion-exchange strengthening step and therefore before the dealkalization step. According to this implementation variant, it seems that the results obtained by the "finish polishing" step regarding, in particular, the roughness, are satisfactory. In addition, as mentioned previously, the dealkalization may contribute to improving the roughness and therefore, in the present case, can but improve the results obtained from the finish polishing step.

The invention also provides a glass substrate, in particular one obtained according to any of the previously described variants of the treatment process according to the invention, the said substrate being intended to be used as a support in a data storage unit, such as a magnetic hard disk, for example for a portable computer.

The substrate according to the invention is made of glass of the silica-soda-lime type which has undergone a surface ion-exchange strengthening step and is characterized by the ratio of the average $Na_2O$ content in a surface layer having a thickness of at least 0.05 microns to the average $Na_2O$ content in the layer strengthened by ion exchange which is less than 40% and preferably less than 20% and/or by the ratio of the average $K_2O$ content in a surface layer having a thickness of at least 0.05 microns to the average $K_2O$ content in the layer strengthened by ion exchange which is less than 60% and preferably less than 40%.

Preferably, the substrate has an average modulus of rupture of greater than 240 MPa and more preferably still greater than 300 MPa.

Preferably also, the glass substrate has an average roughness Rq of less than 5 ångströms.

According to a preferred variant of the invention, the glass substrate has a matrix containing the constituents below in the following weight proportions:

| | |
|---|---|
| $SiO_2$ | 45–65% |
| $Al_2O_3$ | 0–20% |
| $B_2O_3$ | 0–5% |
| $Na_2O$ | 4–12% |
| $K_2O$ | 3.5–12% |
| MgO | 0–8% |
| CaO | 0–13% |
| $ZrO_2$ | 0–20% | the sum of the oxides $SiO_2$, $Al_2O_3$ and $ZrO_2$ remaining less than or equal to 70% of the said composition which optionally contains the oxides BaO and/or SrO in proportions such that:

$$11\% \leq MgO+CaO+BaO+SrO \leq 24\%,$$

and the alkali-metal oxides being introduced with weight percentages such that:

$$0.22 \leq Na_2O/Na_2O+K_2O \leq 0.60.$$

More preferably, the glassware matrix of the glass substrate contains the constituents below in the following weight proportions:

| | |
|---|---|
| $SiO_2$ | 50.50% |
| $Al_2O_3$ | 11.85% |
| CaO | 4.95% |
| MgO | 4.25% |
| $Na_2O$ | 5.25% |
| $K_2O$ | 5.50% |
| BaO | 5.75% |
| SrO | 7.90% |
| $ZrO_2$ | 4.05% |

Other details and advantageous characteristics of the invention will emerge below from the description of an example of implementation of the invention and of the tests carried out.

The implementation of the invention consists firstly in producing a glass substrate to the required dimensions for constructing a support for data storage and more specifically a hard disk intended to equip a portable computer. The substrates produced thus have the shape of a disk whose dimensions are as follows:

| | |
|---|---|
| external diameter: | 65 mm |
| internal diameter: | 20 mm |
| thickness: | 0.635 mm |

These substrates were obtained by conversion of a glass sheet obtained according to the float process using techniques known in the glassmaking industry. These techniques essentially consist of cutting-out, drilling and edge-shaping (or "edging") steps. Other methods can be used to produce these substrates; these may involve a pressing technique consisting in inserting a parison into a mould where a press gives it the desired shape. Other techniques may also be used: for example, techniques of rolling, downward drawing, cutting up into roundels, or any other techniques known to those skilled in the art. There then follows the polishing step, using mechanical means, which makes it possible on the one hand, to achieve the desired thickness and planarity and, on the other hand, a roughness whose Rq is less than 20 ångströms.

The substrates were produced from a sheet of glass whose matrix contains the constituents below in the following weight proportions

| | |
|---|---|
| $SiO_2$ | 50.50% |
| $Al_2O_3$ | 11.85% |
| CaO | 4.95% |
| MgO | 4.25% |
| $Na_2O$ | 5.25% |
| $K_2O$ | 5.50% |
| BaO | 5.75% |
| SrO | 7.90% |
| $ZrO_2$ | 4.05% |

It is worthwhile pointing out that the composition has a high strain-point temperature, i.e. a lower annealing temperature, enabling the toughening and dealkalization treatments to be carried out at relatively high temperatures without excessively relaxing the toughening stresses. The strain-point temperature of this composition is 583° C.

The substrate thus obtained after the polishing step has a roughness of less than 20 ångströms and a variation in planarity over the circumference of less than 7 microns. The tolerance on the planarity is large since it allows high rotational speeds of the disk with a very close read head without the risk of damaging the disk and/or the read head.

However, the substrate thus produced has a mechanical strength, and more particularly a modulus of rupture, and a chemical resistance, especially hydrolytic resistance, which are insufficient.

Quantitative tests were carried out so as to optimize the nature and the operating conditions of the toughening and dealkalization treatments.

A first test consisted in comparing dealkalization treatments. Firstly, a chemical toughening of the substrates is carried out in a potassium nitrate bath at 500° C. for 3 hours. Next, three types of treatment are then compared: no treatment after the chemical toughening, a dealkalization treatment at 100° C. for 24 hours with aluminium chloride $AlCl_3$, and a dealkalization treatment at 500° C. for 1 hour with ammonium sulphate. Next, in each of the cases, the hydrolytic resistance of the substrates is determined. To do this, an ion-release test is carried out by immersing the substrate for 24 hours in demineralized water at 80° C., followed by a plasma-torch assay of the ions which have passed into solution, in particular the ions of alkali metals but also of other elements in the glassware matrix.

The results obtained are presented in the table below; the results are expressed in µg/disk.

| TREATMENTS | | | | |
|---|---|---|---|---|
| Toughening | Dealkalization | Si | Na | K |
| $KNO_3$ - 500° C. - 3 h | none | 155 | 0 | 86 |
| $KNO_3$ - 500° C. - 3 h | $AlCl_3$ - 100° C. - 24 h | 46 | 0 | 4.7 |
| $KNO_3$ - 500° C. - 3 h | $(NH_4)_2SO_4$ - 500° C. - 1 h | 9.5 | 0 | 0 |

In the light of these results, it turns out that both dealkalization treatments may be regarded as satisfactory; however the treatment with ammonium sulphate seems to be more advantageous as it ensures that the hydrolytic resistance lasts longer. In addition, the ammonium sulphate treatment may be carried out, for example, in a tunnel furnace, this being favourable from an industrial standpoint. Another advantage of the ammonium sulphate treatment, already mentioned above, is that it allows further improvement in the surface roughness of the substrate. Other tests were carried out under varying treatment conditions; these tests consisted in carrying out a chemical toughening treatment in a $KNO_3$ bath followed by a dealkalization treatment using ammonium sulphate, the treatment times and temperatures being varied. These tests make it possible, in particular, to determine the conditions which allow dealkalization after the chemical toughening with preservation of sufficient mechanical properties.

The tests carried out are presented in the following table:

| | Chemical strengthening | | Dealkalization | |
|---|---|---|---|---|
| Treatment | T° C. | t (h) | T° C. | t (h) |
| 1 | 450 | 24 | 450 | 3 |
| 2 | 450 | 24 | 550 | 0.5 |
| 3 | 480 | 7 | 480 | 1 |
| 4 | 480 | 7 | 520 | 0.75 |

-continued

| Treatment | Chemical strengthening | | Dealkalization | |
|---|---|---|---|---|
| | T° C. | t (h) | T° C. | t (h) |
| 5 | 480 | 7 | 550 | 0.5 |
| 6 | 500 | 3 | 550 | 0.5 |
| 7 | 500 | 3 | 520 | 0.75 |
| 8 | 500 | 3 | 480 | 1 |

The next table expresses the mechanical strength, more specifically the modulus of rupture, of the substrate following the various treatments. The measurements of the modulus of rupture are obtained using a mechanical test consisting of annular flexure; the test device is composed, on the one hand, of a hollow cylinder 55 mm in diameter on which the substrate is deposited concentrically and, on the other hand, of a hollow cylinder 30 mm in diameter which bears in flexure on the substrate, the latter cylinder also being concentric with the other elements. The values obtained are expressed in MPa. The current requirements are an average modulus of rupture of greater than 240 MPa with a minimum value of greater than 150 MPa.

The results obtained are as follows:

| TREATMENT | MODULUS OF RUPTURE (MPa) |
|---|---|
| 1 | 309 |
| 2 | 352 |
| 3 | 381 |
| 4 | 342 |
| 5 | 327 |
| 6 | 315 |
| 7 | 317 |
| 8 | 349 |

The second table presented below expresses the average quantity of $Na_2O$ and $K_2O$ in a surface layer of 0.05 microns as a percentage with respect to the average quantity of these same elements in the layer strengthened by ion exchange. The 0.05 micron layer corresponds to the dealkalized thickness. These results make it possible to characterize the glass substrate after the treatment according to the invention, i.e. after a chemical toughening treatment followed by a dealkalization treatment.

| TREATMENT | $Na_2O$ % | $K_2O$ % |
|---|---|---|
| 3 | 14 | 31 |
| 4 | 20 | 45 |
| 5 | 37 | 56 |
| 6 | 20 | 56 |
| 7 | 8 | 37 |
| 8 | 7 | 38 |

The results are therefore satisfactory. In addition, the constraints regarding the roughness and planarity of the substrate are also met. Likewise, surface analysis shows that the substrate surface finish remains good and that the treatment is very uniform.

Moreover, the tests carried out have demonstrated, first of all, that a prolonged dealkalization treatment at 550° C. may reduce the surface stresses obtained by chemical toughening. Likewise, it has been demonstrated that a dealkalization treatment at 450° C. for too short a time is not sufficient to obtain good surface uniformity. The inventors have also been able to show that optimal results, i.e. good hydrolytic resistance combined with a satisfactory modulus of rupture, are achieved when the dealkalization treatment temperature is close to the strain-point temperature, without exceeding it, and that the treatment time is sufficiently short not to cause excessive relaxation of the stresses obtained during the chemical toughening treatment. A particularly advantageous ammonium sulphate dealkalization treatment consists in carrying it out at 550° C. for 10 minutes.

With regard to the roughness, the invention advantageously provides an additional "finish polishing" step. Tests were carried out to determine the position of this step in the treatment process. A first test consisted in carrying out this "finish polishing" step immediately after the polishing step, i.e. before the toughening and dealkalization treatments. The roughness obtained on the surface of the substrate in this implementation is improved compared to a treatment without this step. However, it turns out that the subsequent toughening treatment reduces this improvement in the roughness, Rq then being about 10 ångströms. As regards the mechanical strength and chemical resistance values, these are satisfactory.

Another implementation consists in carrying out this "finish polishing" step after the toughening and dealkalization treatments. According to this implementation, the roughness values obtained are markedly superior: the Rq obtained is approximately 5 ångströms. However, the "finish polishing" step must be carried out to a very shallow depth (less than 0.2 microns in the case of a dealkalization treatment using aluminium chloride) in order not to decrease the hydrolytic resistance obtained after dealkalization. This constraint may make this step more difficult to carry out and consequently more expensive.

A final implementation of the invention consists in carrying out this "finish polishing" step after the toughening step and before the dealkalization step. According to this implementation, the value of Rq is slightly greater than in the previous case, but remains less than 7 ångströms. Since the dealkalization step is the final step, the hydrolytic resistance of the substrate is satisfactory. With regard to the modulus of rupture, this is also satisfactory.

The invention thus described therefore makes it possible to produce a glass substrate intended to be used as a support for data storage, the said substrate presenting no risk with regard to the protection of the data over time. In addition, the substrate exhibits physical characteristics (roughness and planarity) and a mechanical strength which are satisfactory for the envisaged application.

What is claimed is:

1. A method for preparing a glass substrate comprising the steps of:
   providing a silica-soda-lime glass substrate having a surface; treating the glass surface to a first depth with an ion-exchange treatment for a sufficient first time and first temperature to provide an ion-exchanged treated glass having a strengthened surface; and
   treating the surface of the ion-exchange treated glass to a second depth with a dealkalization treatment for a sufficient second time and second temperature to remove alkaline ions from the glass surface,
   wherein the second depth is less than the first depth.

2. The method according to claim 1, wherein the ion-exchange treatment is carried out using a chemical bath whereby the first temperature is between 400° C. and 520° C. and the first time is less than 25 hours.

3. The method according to claim 2, wherein the chemical bath comprises potassium nitrate, potassium dichromate, or a mixture of potassium nitrate and silver nitrate.

4. The method according to claim 1, wherein the second depth is less than 1 micron.

5. The method according to claim 1, wherein the dealkalization step comprises applying $AlCl_3$ to a glass surface at a temperature of 100° C. for 24 hours.

6. The method according to claim 1, wherein the dealkalization step comprises sublimation of a sulphate containing compound at the glass surface at a temperature between 450° C. to 580° C. and a time period of less than 5 hours.

7. The method according to claim 6, wherein the sulphate is $(NH_4)_2SO_4$.

8. The method according to claim 1, further comprising a polishing step to provide an average roughness to the glass surface of less than 20 Å.

9. The method according to claim 8, further comprising a second polishing step to provide an average roughness to the glass surface of less than 6 Å.

10. A method for preparing a glass substrate comprising the steps of:

providing a silica-soda-lime glass substrate having at least one surface;

treating the glass surface with an ion-exchange treatment until the $Na_2O$ average content ratio of a layer up to a depth of 0.05 microns to the treated surface layer is less than 40% by weight or until the $K_2O$ average content ratio of the layer up to a depth of 0.05 microns to the treated surface layer is less than 60% by weight; and treating the glass surface to a dealkalization step for a sufficient time and temperature to remove alkaline ions from the glass surface to a second depth, wherein the second depth is less than the first depth.

11. The method according to claim 10, wherein the $Na_2O$ average content ratio is less than 20%.

12. The method according to claim 10, wherein the dealkalization step comprises applying $AlCl_3$ to a glass surface at a temperature of 100° C. for 24 hours.

13. The method according to claim 10, wherein the dealkalization step comprises sublimation of a sulphate containing compound at the glass surface at a temperature between 450° C. to 580° C. and a time period of less than 5 hours.

14. The method according to claim 13, wherein the sulphate is $(NH_4)_2SO_4$.

15. The method according to claim 10, further comprising a polishing step to provide an average roughness to the glass surface of less than 20 Å.

16. The method according to claim 15, further comprising a second polishing step to provide an average roughness to the glass surface of less than 6 Å.

17. The method according to claim 10, wherein the glass surface has an average roughness of less than 15 microns.

18. A glass substrate made using the method according to claim 1.

19. The glass substrate according to claim 18, wherein the $Na_2O$ average content ratio is less than 20% and the $K_2O$ average content ratio is less than 40%.

20. The glass substrate according to claim 18, wherein the glass has an average modulus of rupture greater than 240 MPa.

21. The glass substrate according to claim 20, wherein the glass has an average modulus of rupture greater than 300 MPa.

22. The glass substrate according to claim 18, wherein the glass surface has an average roughness of less than 5 Å.

23. The glass substrate according to claim 18, wherein the glass has a composition by weight of:

| | |
|---|---|
| $SiO_2$ | 50.5% |
| $Al_2O_3$ | 11.85% |
| CaO | 4.95% |
| MgO | 4.25% |
| $Na_2O$ | 5.25% |
| $K_2O$ | 5.50% |
| BaO | 5.75% |
| SrO | 7.90% |
| $ZrO_2$ | 4.05%. |

24. A glass matrix made using the method according to claim 1, wherein $SiO_2$, $Al_2O_3$, and $ZrO_2$ weigh less than or equal to 70% of the composition by weight.

25. A glass matrix made using the method according to claim 1, optionally containing BaO or SrO in proportions such that:

$$11\% \leq MgO+CaO+BaO+SrO \leq 24\%$$

and the alkali-metal oxides are such that:

$$0.22 \leq Na_2O/(Na_2O+K_2O) \leq 0.60.$$

* * * * *

UNITED STATES PATENT AND TRADEMARK OFFICE
CERTIFICATE OF CORRECTION

PATENT NO.  : 6,114,039

DATED       : September 5, 2000

INVENTOR    : Rifqi

It is certified that error appears in the above-identified patent and that said Letters Patent is hereby corrected as shown below:

On the title page at [54]: change "PROCESS" to --METHOD--.

Signed and Sealed this

First Day of May, 2001

Attest:

NICHOLAS P. GODICI

Attesting Officer      Acting Director of the United States Patent and Trademark Office